United States Patent
Ebrahimi Afrouzi et al.

(10) Patent No.: US 10,496,262 B1
(45) Date of Patent: Dec. 3, 2019

(54) ROBOTIC FLOOR-CLEANING SYSTEM MANAGER

(71) Applicants: Ali Ebrahimi Afrouzi, San Jose, CA (US); Soroush Mehrnia, Copenhagen (DK)

(72) Inventors: Ali Ebrahimi Afrouzi, San Jose, CA (US); Soroush Mehrnia, Copenhagen (DK)

(73) Assignee: AI Incorporated, Toronto (CA)

( * ) Notice: Subject to any disclaimer, the term of this patent is extended or adjusted under 35 U.S.C. 154(b) by 1 day.

(21) Appl. No.: 15/272,752

(22) Filed: Sep. 22, 2016

Related U.S. Application Data

(60) Provisional application No. 62/235,408, filed on Sep. 30, 2015, provisional application No. 62/272,004, filed on Dec. 28, 2015.

(51) Int. Cl.
*G06F 3/0484* (2013.01)
*G05D 1/02* (2006.01)
*B25J 11/00* (2006.01)
*B25J 9/16* (2006.01)
*B25J 13/00* (2006.01)

(52) U.S. Cl.
CPC ........ *G06F 3/04847* (2013.01); *B25J 9/1666* (2013.01); *B25J 11/0085* (2013.01); *B25J 13/00* (2013.01); *B25J 13/006* (2013.01); *G05D 1/0219* (2013.01); *G05D 2201/0215* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 5,942,869 A | 8/1999 | Katou et al. | |
| 5,995,884 A * | 11/1999 | Allen | G05D 1/0225 180/167 |
| 6,535,793 B2 | 3/2003 | Allard | |
| 6,667,592 B2 * | 12/2003 | Jacobs | G05D 1/0274 318/568.11 |
| 7,769,492 B2 | 8/2010 | Wang et al. | |
| 7,813,835 B2 | 10/2010 | Fujita et al. | |
| 8,355,828 B2 | 1/2013 | Tolia et al. | |
| 8,364,309 B1 | 1/2013 | Bailey | |
| 8,438,695 B2 | 5/2013 | Gilbert, Jr. et al. | |
| 8,528,157 B2 | 9/2013 | Schnittman et al. | |

(Continued)

OTHER PUBLICATIONS

Non-Final Office Action for Related U.S. Appl. No. 15/949,708 dated Jun. 25, 2018, pp. 1 to 24.

(Continued)

*Primary Examiner* — Ryan Rink

(57) ABSTRACT

A method for instructing operation of a robotic floor-cleaning device based on the position of the robotic floor-cleaning device within a two-dimensional map of the workspace. A two-dimensional map of a workspace is generated using inputs from sensors positioned on a robotic floor-cleaning device to represent the multi-dimensional workspace of the robotic floor-cleaning device. The two-dimensional map is provided to a user on a user interface. A user may adjust the boundaries of the two-dimensional map through the user interface and select settings for map areas to control device operation in various areas of the workspace.

16 Claims, 4 Drawing Sheets

(56) References Cited

U.S. PATENT DOCUMENTS

| | | |
|---|---|---|
| 8,798,834 B2 | 8/2014 | Jeong et al. |
| 8,903,590 B2 | 12/2014 | Jeon |
| 9,008,835 B2 | 4/2015 | Dubrovsky et al. |
| 9,283,674 B2 | 3/2016 | Hoffman et al. |
| 9,298,183 B2 | 3/2016 | Artes et al. |
| 2003/0030399 A1* | 2/2003 | Jacobs ................ G05D 1/0274 318/568.16 |
| 2003/0184436 A1 | 10/2003 | Seales et al. |
| 2006/0020369 A1 | 1/2006 | Taylor et al. |
| 2008/0311878 A1 | 12/2008 | Martin et al. |
| 2009/0082879 A1 | 4/2009 | Dooley et al. |
| 2009/0306822 A1 | 12/2009 | Augenbraun et al. |
| 2010/0082193 A1 | 4/2010 | Chiappetta |
| 2011/0264305 A1* | 10/2011 | Choe ................ G05D 1/0246 701/2 |
| 2011/0267280 A1 | 11/2011 | De Mers et al. |
| 2012/0229660 A1 | 9/2012 | Matthews et al. |
| 2013/0056032 A1* | 3/2013 | Choe ................ A47L 9/0488 134/18 |
| 2013/0060379 A1* | 3/2013 | Choe ................ G06N 3/008 700/245 |
| 2013/0206177 A1 | 8/2013 | Burlutskiy |
| 2014/0100736 A1 | 4/2014 | Kim et al. |
| 2014/0207280 A1* | 7/2014 | Duffley ................ G05D 1/0016 700/257 |
| 2014/0303775 A1* | 10/2014 | Oh ................ G05D 1/0016 700/253 |
| 2014/0320661 A1* | 10/2014 | Sankar ................ H04N 7/183 348/158 |
| 2016/0193729 A1* | 7/2016 | Williams ............ H04B 1/0092 700/258 |
| 2016/0297072 A1 | 10/2016 | Williams et al. |
| 2017/0283092 A1 | 10/2017 | Brown et al. |
| 2018/0200888 A1* | 7/2018 | Kim ................ A47L 11/4061 |

OTHER PUBLICATIONS

Final Office Action for Related U.S. Appl. No. 15/949,708, dated Jan. 15, 2019, pp. 1 to 22.

* cited by examiner

US 10,496,262 B1

ROBOTIC FLOOR-CLEANING SYSTEM MANAGER

CROSS-REFERENCE TO RELATED APPLICATIONS

This application claims benefit of provisional patent application Ser. No. 62/235,408 filed Sep. 30, 2015 and provisional patent application Ser. No. 62/272,004 filed Dec. 28, 2015 by the present inventors.

FIELD OF INVENTION

The present invention relates to a method and computer program product for graphical user interface (GUI) organization control for robotic floor-cleaning devices.

BACKGROUND

Robotic floor-cleaning devices are an increasingly popular solution for keeping floors clean in residential and commercial settings. Many robotic floor-cleaning systems generate maps of their environments using sensors to better navigate through the environment. However, such maps often contain errors and may not accurately represent the areas that a user may want the robotic floor-cleaning device to service. Further, users may want to customize operation of a robotic floor-cleaning device based on location within a map. For example, a user might want a robotic floor-cleaning device to service a first room with a steam cleaning function but service a second room without the steam cleaning function. A need exists for a method for users to adjust a robotic floor-cleaning map and control operations of a robotic floor-cleaning device based on location within the map.

SUMMARY OF INVENTION

The present invention proposes a method and computer program product for graphical user interface (GUI) organization control of robotic floor-cleaning devices.

A map of a workspace is generated from data acquired by sensors positioned on a robotic floor-cleaning device. The map is sent to a user interface on a device such as a smartphone, computer, tablet, dedicated remote control, or any device that may display outputs from the system and receive inputs from a user. Through the user interface, a user may make changes to the map boundaries and select settings for the robotic floor-cleaning device to carry out in user-identified areas of the workspace. User adjustments are sent from the user interface to the robotic floor-cleaning device to implement the changes.

DETAILED DESCRIPTION OF THE INVENTION

Figure 1:
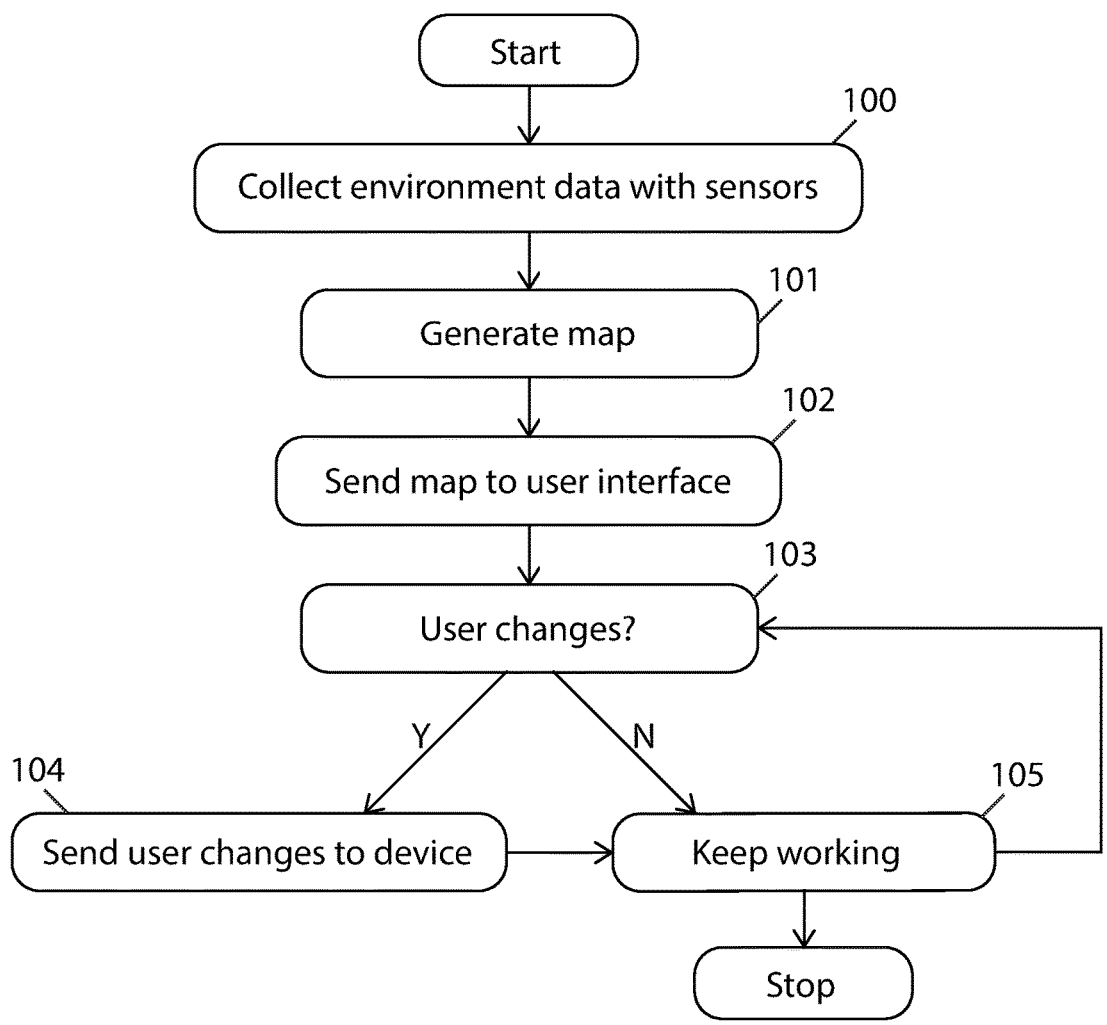
FIG. 1 illustrates the process of generating a map and making changes to the map through a user interface embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The term "user interface" as used herein refers to an interface between a human user or operator and one or more devices that enables communication between the user and the device(s). Examples of user interfaces that may be employed in various implementations of the present invention include, but are not limited to, switches, buttons, dials, sliders, a mouse, keyboard, keypad, game controllers, track balls, display screens, various types of graphical user interfaces (GUIs), touch screens, microphones and other types of sensors that may receive some form of human-generated stimulus and generate a signal in response thereto.

Various methods currently exist for generating maps of an environment. Simultaneous localization and mapping (SLAM) techniques, for example, may be used to create a map of a workspace and keep track of a robotic device's location within the workspace. The mapping of a device's environment is not included in the scope of the invention, therefore a detailed description thereof is not provided.

Once a map is established, it may be sent to a user interface. Maps may be sent to a user interface at any stage; they do not need to be complete. Through the interface, a user may view the map and take any of a variety of actions. A user interface may be provided through a software application on a computer, tablet, smartphone, or a dedicated remote control. In the preferred embodiment, a user may adjust or correct the map boundaries within the user interface by selecting all or part of a boundary line using a cursor, pointer, stylus, mouse, the user's finger, a button or buttons, or other input device on the user interface. Once a boundary line is selected, a user may be provided with various options, such as, but not limited to, deleting, trimming, rotating, elongating, redrawing, moving in a left direction, moving in a right direction, moving in an upward direction, moving in a downward direction, etc. A user may be given the option to redraw a boundary line using a cursor, pointer, stylus, mouse, the user's finger, a button or buttons, or other input devices.

Maps generated by robotic devices may contain errors, be incomplete, or simply not reflect the areas that a user wishes a robotic floor-cleaning device to service. By adjusting the map, a user may perfect the information that the robotic device has about its environment, thereby improving the device's ability to navigate through the environment. A user may, for example, extend the boundaries of a map in areas where the actual boundaries are further than those identified by the system, or trim boundaries where the system identified boundaries further than the actual or desired boundaries. Even in cases where a system creates an accurate map of an environment, a user may prefer to adjust the map boundaries to keep the device from entering some areas.

Data may be sent between the robotic floor-cleaning device and the user interface through one or more network communication connections. Any type of wireless network signals may be used, including, but not limited to, radio signals, Wi-Fi signals, or Bluetooth signals. Map data collected by sensors of the robotic floor-cleaning device is sent to the user interface, where a user may make adjustments and/or apply or adjust settings. Changes made by a user in the user interface are sent to the robotic floor-cleaning device through the one or more network communication connections.

Robotic floor-cleaning devices may have a plurality of tools that can be used concurrently or independently, such as, but not limited to, a suction tool, a mopping tool, and a UV light for killing bacteria. Robotic floor-cleaning devices may also have various settings, such as a deep cleaning setting, a regular cleaning setting, speed settings, movement pattern settings, cleaning frequency settings, etc. In the preferred embodiment, a user is enabled to adjust all of these settings through the user interface. A user may select with a cursor, pointer, stylus, mouse, the user's finger, a button or buttons, a keyboard, or other input devices any portion of the workspace and select one or more settings to be applied to the area.

Referring to FIG. 1, the process of creating a two-dimensional map and utilizing an interactive user interface is illustrated. In a first step 100, the system collects data about the environment with sensors positioned on the robotic floor-cleaning device. In a next step 101, the system generates a two-dimensional map of the workspace based on the collected data. As mentioned previously, any available methods may be used to create a two-dimensional map of the environment, including, but not limited to, simultaneous localization and mapping (SLAM) techniques. In some methods, measurement systems, such as LIDAR, are used to measure distances from the robotic device to the nearest obstacle in a 360 degree plane in order to generate a two-dimensional map of the area. In a next step 102, the two-dimensional map is sent to the user interface via one or more network communication connections. In a next step 103, the system checks for changes made by a user on the user interface. If any changes are detected (to either the map boundaries or the operation settings), the method proceeds to step 104 to send the user changes to the device. If no changes to the map boundaries or the operation settings are detected, the method proceeds to step 105 to continue working without any changes.

Figure 2:
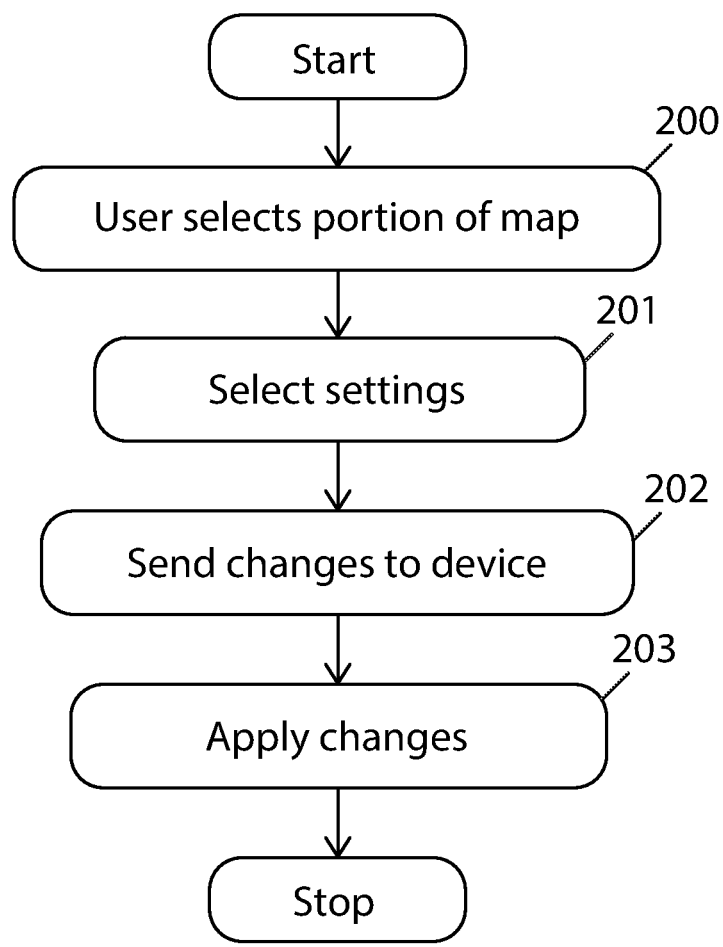
FIG. 2 illustrates the process of selecting settings for a robotic floor-cleaning device through a user interface embodying features of the present invention.

Referring to FIG. 2, the process of customizing robotic device operation through a user interface is illustrated. In a first step 200, a user selects the area of the workspace map in which he or she wants to designate robotic device operation settings. A user may select any size area; the area selected could be comprised of a small portion of the workspace or could encompass the entire workspace.

In a next step 201, a user selects desired settings for the selected area. The particular functions and settings available may be dependent on the capabilities of the particular robotic floor-cleaning device in question. For example, in some embodiments, a user may select any of: cleaning modes, frequency of cleaning, intensity of cleaning, navigation methods, driving speed, etc. In a next step 202, the selections made by the user are sent to the robotic floor-cleaning device. In a next step 203, a processor of the robotic floor-cleaning device processes the received data and applies the user changes.

Figure 3A:
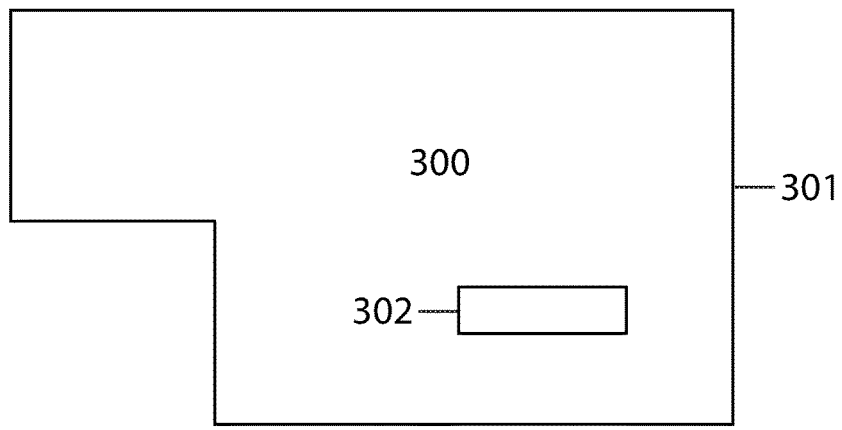
FIG. 3A illustrates an overhead view of the actual boundaries of a workspace embodying features of the present invention.
Figure 3B:
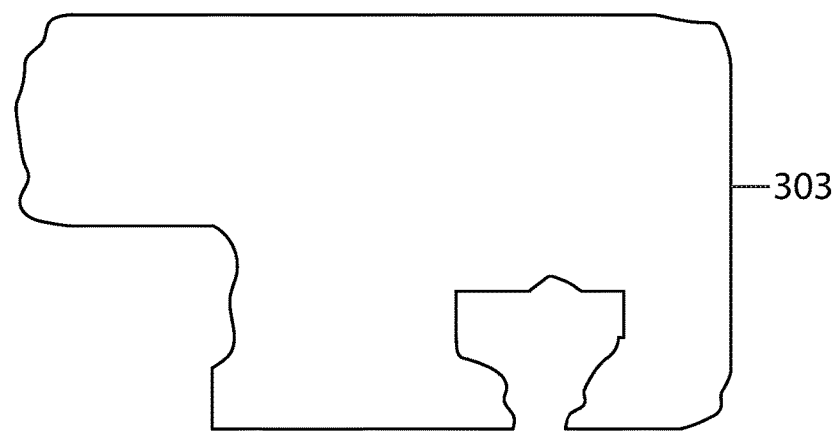
FIG. 3B illustrates an overhead view of a two-dimensional map of a workspace generated by a robotic floor-cleaning device embodying features of the present invention.
Figure 3C:
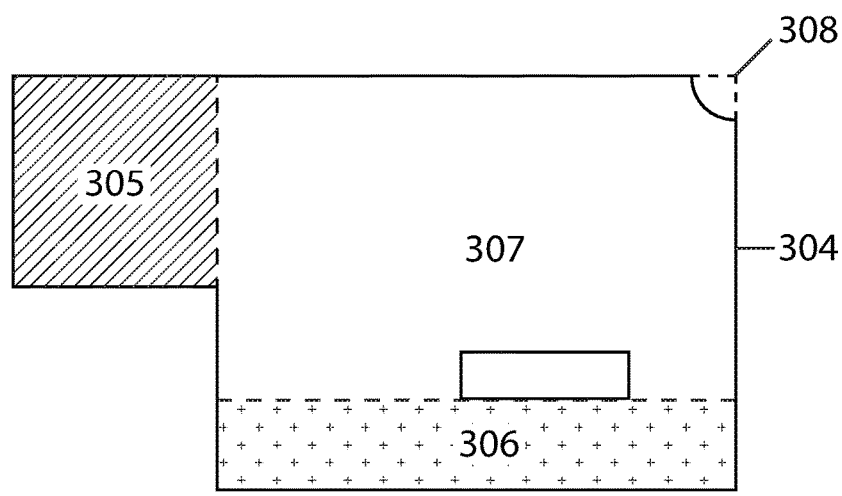
FIG. 3C illustrates an overhead view of a two-dimensional map of a workspace generated by a robotic floor-cleaning device and adjusted by a user embodying features of the present invention.

Referring to FIG. 3A, an overhead view of a workspace 300 is illustrated. This view shows the actual obstacles that may be detected by a robotic floor-cleaning device. The outer line 301 represents the walls of the workspace and the rectangle 302 represents a piece of furniture. Referring to FIG. 3B, an overhead view of a two-dimensional map 303 created by a robotic floor-cleaning device of the workspace 300 shown in FIG. 3A is illustrated. Because the methods for generating the map are not 100% accurate, the two-dimensional map generated is approximate and not perfect. A robotic floor-cleaning device may devise navigation plans based on the generated map, and thus performance may suffer as a result of imperfections in the generated map. A user may desire to correct the boundary lines to match the actual obstacles. Referring to FIG. 3C, an overhead view of a user-adjusted two-dimensional map 304 is illustrated. By changing the boundary lines of the map 303 (shown in FIG. 3B) created by the robotic floor-cleaning device, a user is enabled to create a two-dimensional map of the workspace 300 (shown in FIG. 3A) that accurately identifies obstacles and boundaries in the workspace. Furthermore, as discussed previously, a user may identify areas within the two-dimensional map to be treated in specific ways. By delineating a portion 305 of the map, a user may select settings for that area. For example, a user may identify the area 305 and select weekly cleaning, as opposed to daily or standard cleaning, for that area. In a like manner, a user may define the area 306 and turn on a mopping function for that area. The remaining area 307 may be treated in a default manner. Additionally, in adjusting the boundary lines of the two-dimensional map, a user is permitted to create boundaries anywhere desired, regardless of whether an actual boundary exists in the workspace. In the example shown, the boundary line in the corner 308 has been redrawn to exclude the area near the corner. The robotic floor-cleaning device will thus be prevented from entering the area. This may be useful for keeping a robotic floor-cleaning device out of areas that a user does not want the device to service. For example, a user might exclude from a map areas with fragile objects, pets, cables or wires, etc.

Figure 4:
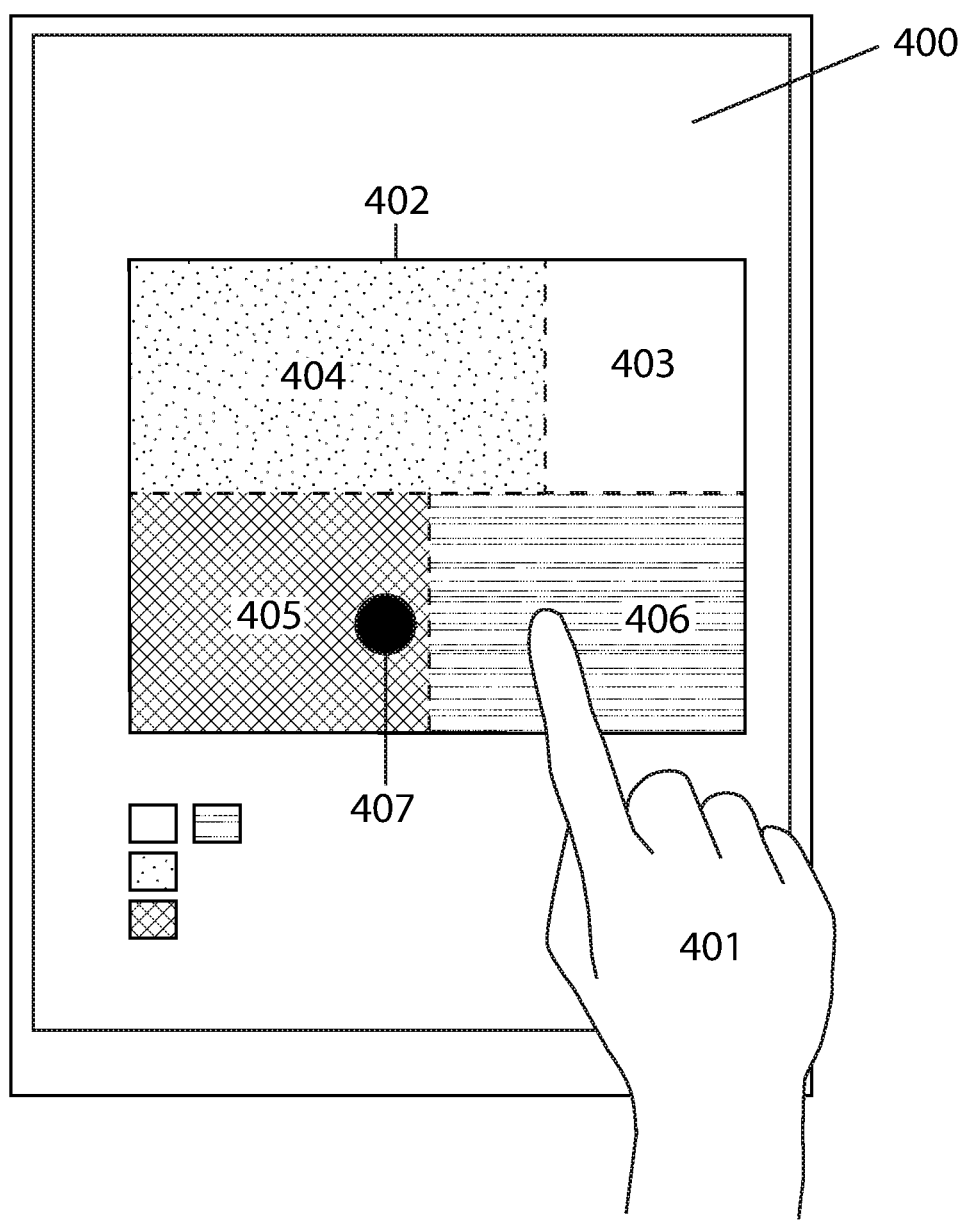
FIG. 4 illustrates an example of a user providing inputs on a user interface to customize a robotic floor-cleaning job embodying features of the present invention.

Referring to FIG. 4, an example of a user interface 400 is illustrated. In the example shown, the user 401 has delineated sections of the workspace 402 to be serviced in different ways by the robotic floor-cleaning device 407. The user has delineated four sections: 403, 404, 405, and 406. The user may select the settings of the robotic floor-cleaning device within each section independently of the other sections using the user interface. In the example shown, a user uses his or her finger to manipulate the map through a touchscreen; however, various other methods may be employed depending on the hardware of the device providing the user interface.

Additionally, a real-time robotic floor-cleaning device manager may be provided on the user interface to allow a user to instruct the real-time operation of the robotic floor-cleaning device regardless of the device's location within the two-dimensional map. Instructions may include any of turning on or off a mop tool, turning on or off a UV light tool, turning on or off a suction tool, turning on or off an automatic shutoff timer, increasing speed, decreasing speed, driving to a user-identified location, turning in a left or right direction, driving forward, driving backward, stopping movement, commencing one or a series of movement patterns, or any other preprogrammed action.

We claim:

1. A tangible, non-transitory computer-readable media storing instructions that, when executed by one or more processors, effectuate operations comprising:
   obtaining, on a user computing device, via the wireless network communication, a map including a room to be cleaned by a robot, wherein:
      the map is based on data from a sensor of the robot,
      the map includes two spatial dimensions of the room,
      the map is obtained with simultaneous localization and mapping by the robot,
      the map includes boundaries of a wall of the room and boundaries of furniture in the room sensed by the robot, and
      at least some of the boundaries designate virtual barriers the robot is configured to avoid crossing when navigating;
   presenting, with the user computing device, the map in a user interface;
   receiving, with the user computing device, via the user interface, a specification of a boundary, the specified boundary being a selection of an existing boundary of the map or a definition of a boundary to be added to the map, wherein receiving the specification of the boundary comprises determining that the user selected a given boundary of, or to be added to, the map based on location on a touchscreen of the user computing device touched by a user;
   receiving, with the user computing device, via the user interface, an adjustment to the map based on the selected boundary, wherein receiving the adjustment comprises receiving a user input indicating the given boundary is to be shifted in one of at least four candidate directions supported by the user interface including: up, down, left, and right;
   after receiving the adjustment, sending, from the user computing device, via the wireless network, instructions that cause the robot to obtain a version of the map that incorporates the received adjustment; wherein:
      the version of the map that incorporates the received adjustment is used to at least partially navigate the robot and to instruct the robot to clean at least part of the room with a cleaning tool;
   receiving, with the user computing device, via the user interface, a selection of an area of the room; and
   presenting, after receiving the selection of the area of the room, a plurality of robotic operations to be executed in the selected the area, the robot operations comprising at least the following:
      turning on a mopping tool;
      turning off a mopping tool;
      turning on an ultraviolet light tool;
      turning off an ultraviolet light tool;
      turning on a suction tool;
      turning off a suction tool;
      turning on an automatic shutoff timer;
      turning off an automatic shutoff timer;
      increasing a robot speed;
      decreasing the robot speed;
      driving the robot to a user-identified location;
      turning the robot;
      driving the robot forward or backward; and
      commencing a series of movements of the robot in a pattern;
   receiving a selection or selections of some of the robotic operations with the user interface;
   executing, with the robot, the selected robotic operations responsive to both the selection of operations and the selection of the area;
   receiving, via the user interface, while the robot is cleaning, a request for the robot to adapt a route; and
   causing, responsive to the request, in real-time, the robot to adapt to the route in response to the request.

2. The medium of claim 1, wherein:
   the user interface has inputs to effectuate four candidate directions of adjustment of the given boundary consisting essentially of: up, down, left, and right.

3. The medium of claim 1, wherein:
   receiving the selection of the boundary of, or to be added to, the map comprises:
      receiving a selection of a part of a line depicting the boundary in the user interface;
   presenting, with the user computing device, via the user interface, and after receiving the selection or selections of some of the robotic operations, a selectable schedule for selecting the frequency of performance of each of the robotic operations;
   the operations comprise, after receiving the selection, presenting, in the user interface, user-selectable options to adjust the boundary including at least three of the following:
      deleting the boundary;
      trimming the boundary;
      rotating the boundary;
      elongating the boundary; or
      re-drawing the boundary.

4. The medium of claim 1, wherein:
   receiving the specification of the boundary comprises creating a boundary to be added to the map via the user interface; and
   the adjustment to the map includes addition of the specified boundary to the map.

5. The medium of claim 1, wherein:
the adjustment comprises applying different cleaning settings to be executed by the robot in different adjacent areas separated by the addition of the specified boundary.

6. The medium of claim 1, wherein the operations comprise:
designating, based on input received via the user computing device, different areas of the map to have different settings of the robot applied in the different areas; and
applying the different settings of the robot in the different areas.

7. The medium of claim 1, wherein the operations comprise:
executing, with the user computing device, a loop in which a determination is made in each iteration of the loop as to whether user input relating to a change in the map is received.

8. The medium of claim 1, wherein the operations comprise:
steps for generating a map and making changes to the map through a user interface; and
steps for selecting settings for a robotic floor cleaning device through a user interface.

9. The medium of claim 1, wherein the operations comprise:
receiving, via the user interface, while the robot is cleaning, a request to change operation of the robot to disable the cleaning tool; and
causing, responsive to the request, the robot to be instructed to disable the cleaning tool.

10. The medium of claim 1, wherein the operations comprise:
receiving, via the user interface, while the robot is cleaning, a request to drive the robot to a user-designated location; and
causing, responsive to the request, in real-time, the robot to drive to the user-designated location.

11. The medium of claim 1, wherein:
receiving the specification of the boundary of the map comprises receiving a selection of a boundary of the map, the map being determined by the robot with simultaneous localization and mapping, the map identifying free space and obstacles of a work environment of the robot in the room.

12. The medium of claim 1, wherein obtaining the map including the room comprises:
receiving an incomplete map with the user computing device from the robot and presenting a visual representation of the incomplete map.

13. The medium of claim 1, wherein:
the operations comprise generating the map by the robot.

14. The medium of claim 1, wherein the operations comprise:
selecting a plurality of cleaning tools comprising instances of cleaning tools selected from among the following:
a suction tool,
a mopping tool, or
an ultraviolet light.

15. The medium of claim 14, wherein the operations comprise:
designating different areas of the map to be cleaned with different ones of the cleaning tools responsive to inputs received via the user interface.

16. The medium of claim 1, wherein:
the robot is configured to apply the plurality of cleaning tools concurrently in at least some areas of the map.

* * * * *